Sept. 20, 1960 P. S. VILES 2,953,450
REDUCTION OF ORE
Filed July 9, 1958 2 Sheets-Sheet 1

INVENTOR.
PRENTISS S. VILES,
BY
ATTORNEY

Sept. 20, 1960 P. S. VILES 2,953,450
REDUCTION OF ORE
Filed July 9, 1958 2 Sheets-Sheet 2

INVENTOR.
PRENTISS S. VILES,
BY
ATTORNEY.

United States Patent Office

2,953,450
Patented Sept. 20, 1960

2,953,450

REDUCTION OF ORE

Prentiss S. Viles, Baytown, Tex., assignor, by mesne assignments, to Esso Research and Engineering Company, Elizabeth, N.J., a corporation of Delaware Filed July 9, 1958, Ser. No. 747,386

9 Claims. (Cl. 75—26)

The present invention is directed to a method for reduction of reducible metallic ores such as the iron oxides and sulfides. More particularly, the invention is concerned with the reduction of reducible metallic ores to the metals by direct contact with a normally gaseous hydrocarbon. In its more specific aspects, the invention is concerned with the reduction of iron ore to substantially pure iron employing a fluidized system.

The present invention may be briefly described as a method for reducing iron ore in which a mixture of finely divided iron ore with a finely divided dehydrogenation catalyst is formed. The iron ore and the catalyst have particle sizes within the range between about 0 and about 25,000 microns to be limited only by fluidization characteristics. The mixture is then contacted with a normally gaseous hydrocarbon under fluidizing condition to form a suspension of the mixture in the normally gaseous hydrocarbon and the suspension is maintained at a temperature in the range from about 850° to about 1600° F. to reduce the iron ore to substantially pure iron. Thereafter, the substantially pure iron and catalyst are separated and recovered, the catalyst being recycled and admixed with additional quantities of the finely divided iron ore.

The catalyst is preferably cobalt molybdate supported on a suitable carrier. However, other catalysts, such as nickel, chromium, platinum, palladium, molybdenum, and the like, may be employed, either as oxides or as the metals and supported on suitable supports, such as alumina, zirconia, kieselguhr, clays, and the like. The iron ore and the catalysts have particle sizes suitable for fluidizing the iron ore and catalyst mixture in the normally gaseous hydrocarbon.

Ordinarily, particle sizes for the iron ore are within the range from about 0 to about 25,000 microns, with a major amount of the iron ore for fluidized operations having particle sizes in the range from about 10 to about 200 microns. A preferred range is from about 0 to about 3000 microns. The particle size of the catalyst may range from about 0 to about 25,000 microns. For fluidized operations the catalyst may have a major amount with particle sizes in the range from about 10 to about 200 microns. A preferred range is from about 0 to about 3000 microns.

Temperatures may range suitably from about 850° F. to about 1600° F., with a preferred temperature from about 1300° to about 1400° F.

Pressures may range from about atmospheric up to about 1000 pounds per square inch gauge. A satisfactory pressure range may be from about atmospheric to about 200 pounds per square inch gauge.

The contact time between the gas and the catalyst in the mixture may range from about 1 to about 1000 volumes of gas per volume of catalyst per hour, with a suitable contact time being about 80 volumes of gas per volume of the catalyst per hour.

In forming the mixture, the ratio of catalyst to ore is in the range from about 1 to about 20 to about 20 to about 1, with a preferred ratio of about 1 to 1.

The normally gaseous hydrocarbon is preferably methane, but suitably may include ethane and propane and may, if desired, be natural gas.

The iron ores employed in the present invention may suitably be taconite and iron ores such as blue iron ore, red iron ore, pyrites, and the like.

In practicing the present invention, the raw ore is preferably ground in grinding equipment and sized for a fluidized solids operation. To this powdered ore is added a suitable catalyst of the nature described, also suitably ground and sized. The catalyst is preferably cobalt molybdate supported on alpha alumina sized for separation from the reduced ore as determined by the separation method employed. The mixture of ore and catalyst is then contacted with the normally gaseous hydrocarbon in a fluidized condition at temperatures ranging from about 850° F. to about 1600° F. and at pressures within the range stated. Steam may be admixed with the hydrocarbon as desired. During the reaction hydrogen and carbon monoxide are formed from the hydrocarbon in situ and these reactants reduce the ore to the metal.

The gaseous reaction products are withdrawn from the reduced metal-catalyst mixture for recycling, burning, or for use as desired, and the reduced metal-catalyst mixture is discharged into a separation zone wherein the catalyst is separated for recycle to the reduction zone and the reduced metal powder is withdrawn for further processing as may be desired.

The present invention will be further illustrated by reference to the drawing in which.

Figures 1, 2:
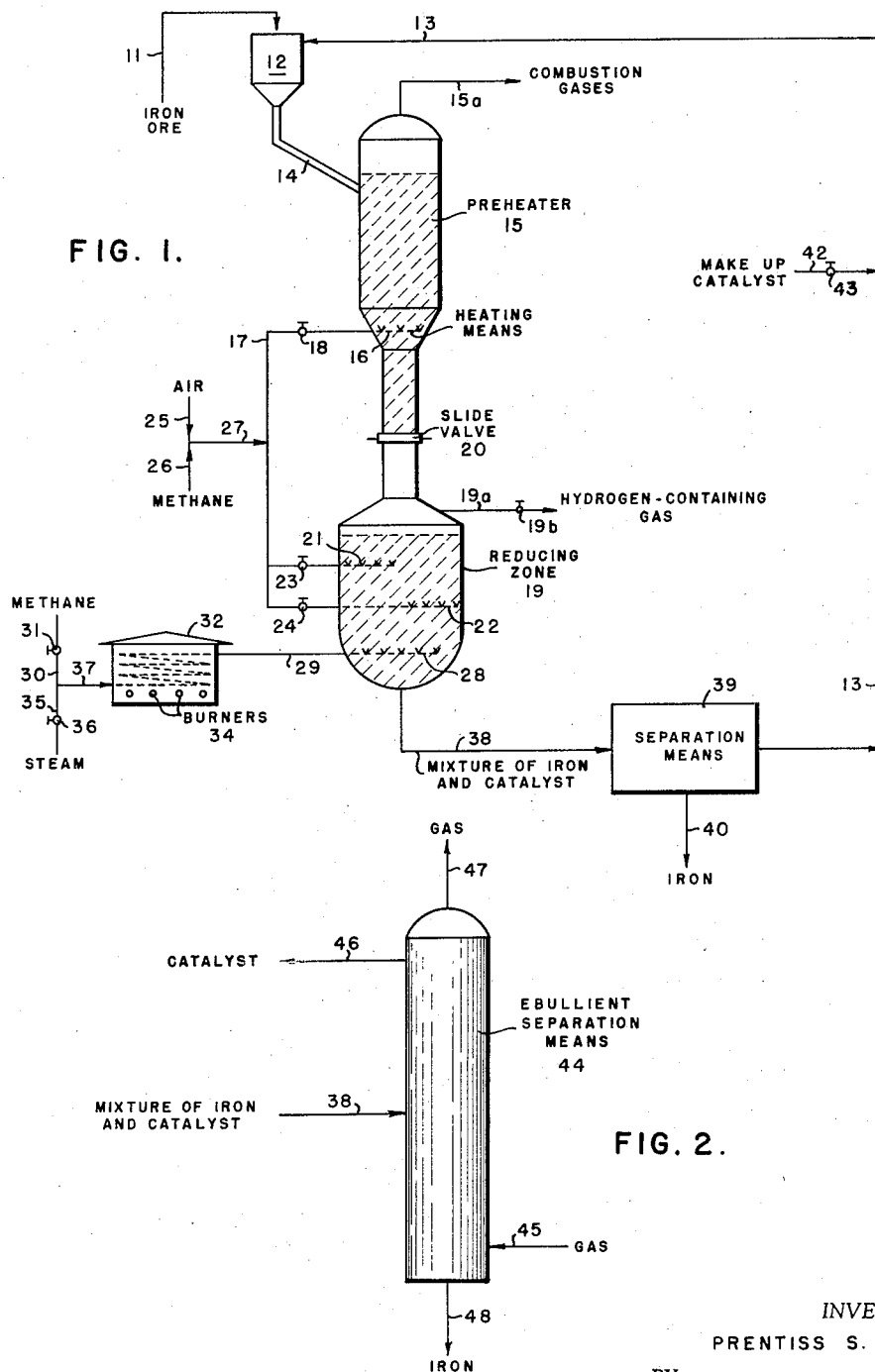
Fig. 1 is a flow diagram of one mode of practicing the invention.
Fig. 2 illustrates a preferred mode of separating the catalyst and the substantially purified iron.

Referring now to the drawing, in which identical numerals will be employed to designate identical parts, and particularly to Fig. 1, numeral 11 designates a line which may be a carrier means by way of which the iron ore in a finely divided condition is introduced into a hopper 12, wherein it is admixed with the finely divided catalyst introduced into hopper 12 by way of line 13. For fluidized operations such as described with respect to Fig. 1, the iron ore has a particle size of 0 to about 3000 microns. The mixture of iron ore and catalyst then discharges by way of line 14 into a preheating zone 15, wherein the mixture of iron ore and catalyst is suitably heated by a heating means illustrated by numeral 16. The heating means may suitably be a burner or may be other heating means such as an electrical resistance heating coil. For purposes of illustration only, heating means 16 is shown as a gas burner. A combustible mixture is introduced into the heating means 16 from the manifold 17 controlled by valve 18 to preheat the iron ore and catalyst to a temperature within the range given. The preheated ore is then discharged from the zone 15 into a reducing zone 19 by way of a slide valve 20. Reducing zone 19 is provided with heating means 21 and 22 which, similar to heating means 16, may be a gas burner or may be an electrical resistance heating means. For purposes of illustration, heating means 21 and 22 are shown as gas burners which receive a combustible gas mixture from manifold 17, controlled by valves 23 and 24, manifold 17 being provided with lines 25 and 26 through which air or pure oxygen and fuel gas, such as methane, respectively, are introduced into manifold 17 by way of line 27. Heating means 21 and 22 serve to maintain a desired temperature range within the reducing zone 19.

Arranged in the lower portion of zone 19 is a suitable spider or distribution means 28 by way of which normally gaseous hydrocarbon, such as methane, is introduced into the system from line 29, the methane in line 29 being introduced by way of line 30, controlled by valve 31, into a heating means 32, such as a furnace provided with a heating coil 33 which connects into line 29, the furnace 32 being provided with gas burners 34. Connecting into the coil 33 also is line 35, controlled by valve 36, by way of which steam is introduced into line 37 which leads into the coil 33.

By virtue of the temperature conditions and the flow rate in reducing zone 19, a reducing action takes place in which the methane is converted to hydrogen and carbon. The hydrogen reacts with the iron ore to form water, which, in turn, reacts with the carbon from the methane molecule in the presence of a catalyst to form carbon monoxide and more hydrogen. This cyclic type reduction reaction continues until substantially all of the metal ore is reduced to the metal. The mixture of iron and catalyst is withdrawn from the zone 19 by way of a line 38 and introduced thereby into a separation means 39 which suitably may be a screening, magnetic, or centrifugal separating means. In separating means 39, the iron is separated from the catalyst and discharged by way of line 40 and recovered thereby, while the catalyst is withdrawn by way of line 13 and recovered for recycling to hopper 12. If desired, makeup catalyst may be introduced by way of line 42, controlled by valve 43. While not shown, it may be desirable to provide suitable blowers, conveyers, and the like, for example, in lines 38 and 13 to move the mixture of iron and catalyst to means 39 and from means 39 to hopper 12.

In the preheater 15 combustion gases will be formed, and these combustion gases are suitably discharged from preheater 15 by way of line 15a. These gases may contain a substantial amount of heat and may be used to provide part of the heat for the operation. Likewise, gases may be discharged from zone 19 and these gases may comprise hydrogen, carbon monoxide, carbon dioxide, and unreacted methane. The gases discharged from zone 19 are withdrawn by way of line 19a, controlled by valve 19b, for suitable recovery. Since these gases contain a substantial amount of heat, they may be used to heat at least partially the iron ore and the catalyst or the methane and steam, as may be desired.

Referring now to Fig. 2, the mixture of catalyst and iron in line 38 may preferably be discharged into an ebullient separation means comprising a tower 44, leading into which is line 45, to cause a separation between the catalyst and the iron ore. The flow of gas, which may be any inert or reducing gas that will not decompose at these conditions and preferably shall be the off gas from the ore reduction reactor itself; i.e., hydrogen, carbon monoxide, methane, etc. is at a velocity within the range of 0.05 ft./sec. to about 1 ft./sec. to cause the catalyst and iron having different sizes and specific gravities to be separated. Thus, a catalyst such as cobalt molybdate may have a specific gravity of about 3.0–4.0, and the substantially pure iron may have a specific gravity of about 6.0–8.0. Thus, by providing a gas velocity of about 0.05 ft./sec. to about 1 ft./sec., the catalyst may be separated in the separation means 44 and withdrawn by way of line 46 and introduced into the hopper 12 after regeneration as needed. Gas is discharged from separation means 44 by line 47, and the iron is withdrawn by line 48.

When a screening means is employed, the iron ore charged to the operation and the catalyst are sized so that the reduced iron ore and the catalyst have different sizes, one being larger or smaller than the other. By providing a suitable screening means, it is then possible to make a separation between the two.

Figure 3:
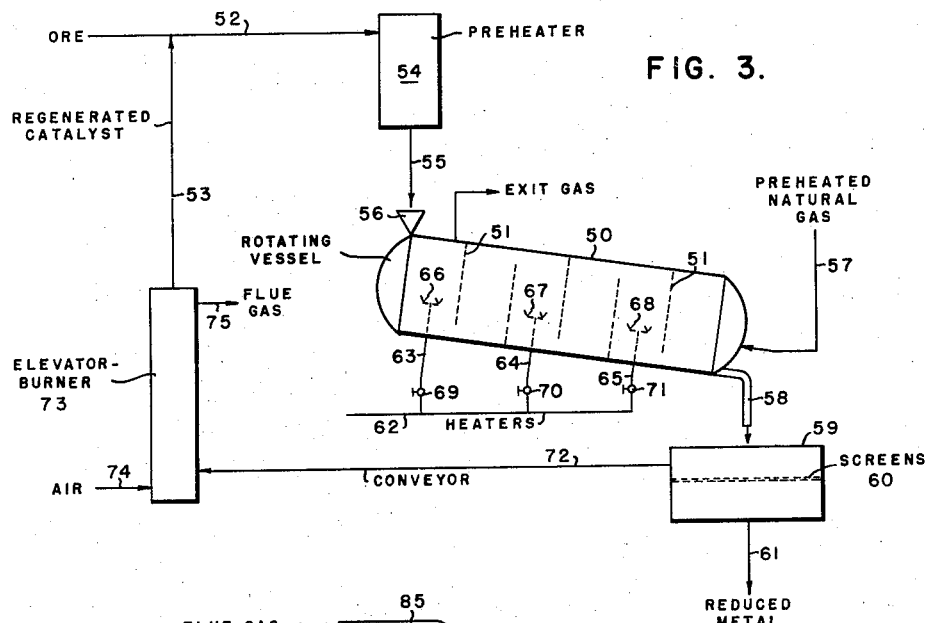
Fig. 3 illustrates a further mode of practicing the invention employing a rotating vessel.

Referring now to Fig. 3, a mode of operation will be described in which a rotating vessel is employed. In this mode and embodiment of the present invention, numeral 50 designates a rotating vessel of the rotary kiln type provided with means for rotating the vessel, not shown. The vessel 50 is provided with a series of baffles 51 extending across the interior of the vessel to provide mixing for the contents thereof.

Iron ore, from a source not shown, is introduced into the system by way of line 52 and is admixed therein with regenerated catalyst introduced by line 53, which may be a suitable conveyor leading from suitable treating steps which will be described further. The mixture of ore and regenerated catalyst discharges into a preheater 54 in which the temperature of the mixture is raised to a temperature in the range from 850° to 1600° F. and the heated mixture then discharges by way of line 55 into a hopper or funnel shaped member 56 which introduces the mixture into vessel 50.

Flowing countercurrent to the mixture of iron ore and catalyst is preheated natural gas hydrocarbons which are introduced into vessel 50 by way of line 57, the preheated natural gas hydrocarbons being at the temperature in the range required to reduce the iron ore in vessel 50. As the iron ore and catalyst contact the natural gas hydrocarbons, the iron ore is reduced to substantially pure iron and the reduced iron ore discharges from the lower end of vessel 50 by way of outlet 58 into a separating vessel 59 which may be provided with a vibrating screen 60 to separate the reduced metal from the carbon-bearing catalyst, the reduced metal being recovered by way of line 61 for use in making steel as may be desired.

It may be desirable to supply heat to vessel 50 and to this end, manifold 62 is provided which connects by way of lines 63, 64 and 65 to burners 66, 67 and 68. Lines 63, 64 and 65 are suitably controlled by valves 69, 70 and 71. It is to be understood that rather than gas heaters, other suitable and equivalent heating devices may be used, such as electrical heaters, and the like.

The carbon-bearing catalyst is withdrawn from the vibrating screen 60 in separation means 59 by a conveyor 72 which introduces the carbon-bearing catalyst in a heated condition into an elevator zone 73 which also serves as a burner for removing the carbonaceous material from the catalyst and to supply some of the heat for the operation. To conduct the burning operation in elevator or burner zone 73, air is introduced therein by way of line 74 which on contact with the carbon-bearing catalyst supports a combustion operation in zone 73, with flue gas being discharged therefrom by line 75.

From the description of Fig. 3, it may be seen that other apparatus and operations may be employed in reducing iron ore in the presence of normally gaseous hydrocarbons and a catalyst.

Figure 4:
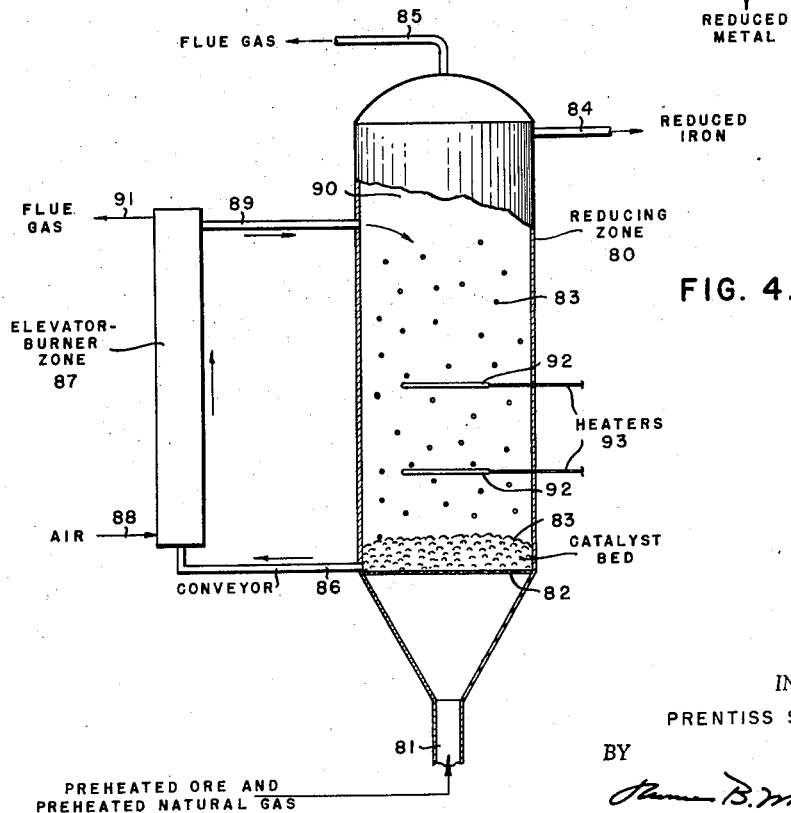
Fig. 4 illustrates a moving bed type of operation encompassing the present invention.

Another mode of operation in accordance with the present invention is described with reference to Fig. 4. Referring now to Fig. 4, numeral 80 designates a reducing zone into which preheated iron ore having a particle size in the range from about 0 to about 3000 microns is introduced along with preheated natural gas by way of line 81, the preheated natural gas serving to convey and move the iron ore into the vessel 80. The mixture of ore and gas in line 81 may suitably be at a temperature in the range from about 850° to about 1600° F. Retained on a suitable grid plate 82 in the lower part of the vessel 80 are a plurality of heat resistant or heat carrying spheres 83, coated with the catalyst. These spheres have sizes in the range up to about about 25,000 microns but preferably may be in the range from about 0 to about 15,000 microns. The grid plate 82 may be a foraminous member but may suitably be a grid having openings of sufficient size to retain the heat resistant or heat carrying spheres 83 thereon but of sufficient size to allow the preheated ore and the natural gas suspension to pass upwardly therethrough. The catalyst and the ore should be of different sizes such that the finely divided ore and gas may pass upwardly through the grid and the catalyst-coated spheres. Stating this otherwise, the catalyst coated spheres may be of a larger diameter than the diameter of the iron ore. On contact of the preheated ore and the natural gas or normally gaseous hydrocarbons with the catalyst-coated heat resistant or heat carrying spheres, the iron ore is reduced to substantially pure iron. The reduced iron passes upwardly by the velocity of the flowing gas in the vessel 80 and the reduced iron is withdrawn therefrom by way of line 84 for further use as may be desired. Inert gases or flue gases are removed from vessel 80 by line 85.

The heat resistant or heat carrying catalyst-coated spheres are withdrawn from above the grid plate 82 to a conveyor 86 which discharges into an elevator-burner zone 87 which may be similar to zone 73. Air is introduced into zone 87 by way of line 88 and supports a combustion operation in the elevator-burner zone 87 to burn carbonaceous deposits from the catalyst-coated heat resistant or heat carrying spheres to regenerate same in zone 87, discharging into a second conveyor 89 which returns the spheres 83 into vessel 80 and allows them to drop downwardly therein in countercurrent flow to the ascending partly reduced iron ore which, on reaching the disengaging section 90 of vessel 80, is substantially in a reduced condition for withdrawal by line 84 as has been described.

Flue gas is withdrawn from zone 87 by line 91 and may be discharged thereby from the system.

The heat resistant or heat carrying spheres may be suitably constructed of ceramic material or other heat resistant or heat carrying material.

It may be desirable to provide a heating means such as burners 92 in the vessel 80 supplied with gas by way of lines 93 for controlling the temperature in the vessel 80. The gas, of course, would be supplied in admixture with an oxygen-containing gas to support a combustion operation in the vessel 80. Other equivalent heating means may be employed.

It will be noted from Fig. 4 that this mode of operation also allows the production of substantially pure iron wherein reduction is obtained in situ in the presence of a catalyst and a gaseous hydrocarbon.

Where a magnetic separation means is employed, the substantially pure iron is magnetic, whereas a non-magnetic catalyst is employed, or a magnetic catalyst is employed on a non-magnetic support such that the catalyst and the iron may be separated.

Where a centrifugal means is employed, by employing a centrifuge having a variable force and by virtue of the catalyst having a different size and specific gravity, separation between the catalyst and the substantially pure iron is effected.

The present invention is quite advantageous and useful in that low quality ores may be reduced directly to substantially pure metals. Furthermore, the present invention allows a continuous separation to be employed, with a continuous withdrawal of substantially purified iron. Additionally, hydrogen for the reduction is formed in situ and results in the cost of the iron being substantially reduced. For example, employment of the present invention results in a substantially economic advantage in that by virtue of the employment of a catalyst and by virtue of the production thereby of hydrogen, the temperature of operation is several hundred degrees Fahrenheit lower than the temperature required in the prior art operation.

The nature and objects of the present invention having been completely described and illustrated, what I wish to claim as new and useful and secure by Letters Patent is:

1. A method of conversion of iron ore to substantially pure iron which comprises forming a mixture of iron ore with a dehydrogenation catalyst selected from the group consisting of cobalt molybdate and the metals and oxides of nickel, chromium, platinum, palladium and molybdenum, and contacting the mixture with a normally gaseous hydrocarbon at a temperature within the range from about 850° to about 1600° F. to reduce said iron ore to substantially pure iron, and then separating and recovering the substantially pure iron and catalyst.

2. A method of conversion of iron ore to substantially pure iron which comprises forming a mixture of finely divided iron ore with a finely divided dehydrogenation catalyst selected from the group consisting of cobalt molybdate and the metals and oxides of nickel, chromium, platinum, palladium and molybdenum, the iron ore and catalyst having a particle size within the range between about 0 and about 25,000 microns, contacting the mixture with a normally gaseous hydrocarbon at a temperature within the range from about 850° to about 1600° F. to reduce said iron ore to substantially pure iron, and then separating and recovering the substantially pure iron and catalyst.

3. A method in accordance with claim 2 in which the catalyst is cobalt molybdate.

4. A method in accordance with claim 2 in which the hydrocarbon is methane.

5. A method in accordance with claim 2 in which the catalyst is supported on a carrier therefor.

6. A method of conversion of iron ore to substantially pure iron which comprises forming a mixture of finely divided iron ore with a finely divided dehydrogenation catalyst selected from the group consisting of cobalt molybdate and the metals and oxides of nickel, chromium, platinum, palladium and molybdenum, the iron ore and catalyst having a particle size within the range between about 0 and about 3000 microns, fluidizing and contacting the mixture with a normally gaseous hydrocarbon at a temperature within the range from about 850° to about 1600° F. at a pressure within the range from about atmospheric to about 1000 pounds per square inch gauge to reduce said iron ore to substantially pure iron, and then separating and recovering the substantially pure iron and catalyst.

7. A method in accordance with claim 6 in which the catalyst is cobalt molybdate on alumina.

8. A method of conversion of iron ore to substantially pure iron which comprises forming a mixture of finely divided iron ore with a finely divided dehydrogenation catalyst selected from the group consisting of cobalt molybdate and the metals and oxides of nickel, chromium, platinum, palladium and molybdenum, the iron ore and catalyst having a particle size within the range between about 0 and about 3000 microns, fluidizing and contacting the mixture with a normally gaseous hydrocarbon at a temperature within the range from about 850° to about 1600° F. to reduce said iron ore to substantially pure iron, separating and recovering the substantially pure iron and catalyst, and admixing the recovered catalyst with additional amounts of finely divided iron ore.

9. A method in accordance with claim 2 in which the normally gaseous hydrocarbon is natural gas.

References Cited in the file of this patent

UNITED STATES PATENTS

| | | |
|---|---|---|
| 2,019,785 | Janssen | Nov. 5, 1935 |
| 2,048,112 | Gahl | July 21, 1936 |
| 2,339,808 | Ravenestad et al. | Jan. 25, 1944 |
| 2,341,995 | Kipper | Feb. 15, 1944 |
| 2,343,780 | Lewis | Mar. 7, 1944 |
| 2,395,286 | Merle | Feb. 19, 1946 |
| 2,462,900 | Riott | Mar. 1, 1949 |
| 2,464,812 | Johnson | Mar. 29, 1949 |
| 2,486,361 | Nahin et al. | Oct. 25, 1949 |
| 2,547,380 | Fleck | Apr. 3, 1951 |
| 2,620,313 | Odell | Dec. 2, 1952 |
| 2,671,765 | McGrath et al. | Mar. 9, 1954 |
| 2,743,215 | Riblett et al. | Apr. 24, 1956 |
| 2,805,144 | Stotler | Sept. 3, 1957 |